United States Patent
Rajaniemi et al.

(10) Patent No.: US 7,486,957 B2
(45) Date of Patent: *Feb. 3, 2009

(54) METHOD OF PERFORMING AN AREA UPDATE FOR A TERMINAL EQUIPMENT IN A COMMUNICATION NETWORK

(75) Inventors: Jaakko Rajaniemi, Helsinki (FI); Tony Hulkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/446,516

(22) Filed: Jun. 5, 2006

(65) Prior Publication Data

US 2007/0105543 A1    May 10, 2007

Related U.S. Application Data

(63) Continuation of application No. 10/433,104, filed as application No. PCT/EP00/12101 on Dec. 1, 2000, now Pat. No. 7,069,022.

(51) Int. Cl.
*H04Q 7/20* (2006.01)
(52) U.S. Cl. .............. 455/456.1; 455/435.1; 455/435.2; 455/432.1
(58) Field of Classification Search ............... 455/456.1, 455/435.1–435.2, 432.1
See application file for complete search history.

(56) References Cited

U.S. PATENT DOCUMENTS 6,397,065 B1 * 5/2002 Huusko et al.
6,792,270 B1 * 9/2004 Neumann
2002/0065081 A1 * 5/2002 Barany et al. ............... 455/450

FOREIGN PATENT DOCUMENTS

| EP | 1051050 A1 | 11/2000 |
| WO | WO 98/32304 A2 * | 7/1998 |
| WO | WO 98/37721 * | 8/1998 |
| WO | WO 00/21319 A1 * | 4/2000 |
| WO | WO 01/15479 * | 3/2001 |

* cited by examiner

*Primary Examiner*—Duc Nguyen
*Assistant Examiner*—Wayne Cai
(74) *Attorney, Agent, or Firm*—Harrington & Smith, PC

(57) ABSTRACT

The present invention proposes a method of performing an area update for a terminal equipment (4A, 4B) in a communication network (1, 2, 3, 5, 6), the communication network comprising at least two areas (5, 6) being defined within an access network, at least one of said areas being served by at least two core network elements (1-2, 2-3) of corresponding network element types, each of said at least two core network elements communicating with said access network defining said areas via a different interface (Iu, Gb), the method comprising the steps of: monitoring, at the terminal equipment side, via which of said at least two core network elements (1, 2) serving a currently visited area (5) the communication with the terminal equipment (4A) is effected, detecting, at the terminal equipment side, an area update condition for said terminal (4A, 4B), requesting, by said terminal equipment, an area update for said terminal equipment (4B), and wherein said terminal equipment (4B) sets an identifier in said area update request identifying the core network element via which the communication with the terminal equipment (4A) has previously been effected. Still further, the present invention proposes also an accordingly adapted terminal equipment.

60 Claims, 1 Drawing Sheet

METHOD OF PERFORMING AN AREA UPDATE FOR A TERMINAL EQUIPMENT IN A COMMUNICATION NETWORK

CROSS REFERENCE TO RELATED APPLICATIONS

This patent application is a continuation of U.S. patent application Ser. No. 10/433,104, filed on Sep. 5, 2003, and issued as U.S. Pat. No. 7,069,022 on Jun. 27, 2006, which is a 371 of and claims priority to PCT/EP00/12101, filed on Dec. 1, 2000.

BACKGROUND OF THE INVENTION

1. Field of the Invention

The present invention relates to method of performing an area update for a terminal equipment in a communication network, and also to a correspondingly adapted terminal equipment.

2. Description of the Prior Art

Generally, communication networks consist of an access network and a core network. The access network is specifically adapted to a connection technology used for terminal equipment communicating with/via the network, whereas the core network is connection technology independent and manages the functions the network offers to the terminals registered in the network.

Currently, for example, there exists the GSM network (GSM=Global Standard for Mobile Communication), consisting of a so called base station subsystem BSS as the access network part and the core network comprising e.g. the mobile services switching center MSC, a home location register HLR, visitor location register VLR etc. The base station subsystem BSS is connected to the core network via an interface known as A-interface. Further, the base station subsystem comprises a plurality of base station BS and/or base transceiver stations BTS under control of a base station controller BSC. Each base station BS defines a cell and a plurality of cells form a location area. Typically, a location area has a size (number of cells) such that one MSC may effect control of communication within a location area. The above briefly described GSM communication system is also known as a second generation system (2G), which initially was basically intended and provisioned for speech data transmission (circuit switched data, real time data transmission).

Meanwhile, however, the need for packet data transmission (data different from speech) (non-real time, packet switched data) has increased, which led to the development of a so-called GPRS network (General Packet Radio Service). The GSM and GPRS communication network exist somewhat in parallel and rely on substantially the same access network. With regard to the core network, in a GPRS network the function of the MSC is performed by so-called GPRS Support Nodes GSN, among which there are Serving GPRS support nodes SGSN (and gateway GPRS support nodes GGSN). The BSS is connected to the SGSN via an interface known as Gb interface.

Hence, a single cell in such a communication network scenario may be connected to different core network elements of different types, i.e. SGSN and/or MSC/VLR.

Now, in case a terminal equipment (for example, mobile station MS) has moved within the network such that a new MSC/VLR and/or new SGSN is in charge for controlling communication in that part of the network, the necessity for a routing and/or location area update arises. The terminal then performs a routing and/or location area update, that is requests a new SGSN and/or MSC/VLR to take over communication control for the requesting terminal equipment. In such a routing and/or location area update RAU/LAU, the terminal equipment transmits the old, that is previous, routing area identity RAI and/or location area identity LAI of the routing/location area it was previous attached to and/or communicating with.

Using the transmitted RAI (LAI), the new core network element finds an address of the core network element previously in charge for controlling/managing communication with the terminal, that is the new core network element in the new routing area may locate the previous (old) core network element (SGSN and/or MSC/VLR) from where the subscriber data for the requesting terminal equipment are sent to the core network element at the new (current) location (new SGSN and/or new MSC/VLR).

With a continuously progressing development in communication networks, also a so-called third generation (3GPP=$3^{rd}$ generation partnership project) of communication networks is being developed. The communication network of the third generation is also referred to as UMTS (Universal Mobile Telecommunication System). According to UMTS/3GPP specifications, base stations in GSM correspond to Node_B's, mobile stations MS as terminal equipment are referred to as user equipment UE, etc. Also with a third generation (3G) communication network, a circuit switched data transfer (for example, for speech) as well as a packet switched data transfer is enabled. To this end, the 3G access network is connected or at least connectable via a Iu-CS interface to a 3G MSC/VLR and via a Iu-PS interface to a 3G SGSN.

With a demand that most recently developed equipment should be downward compatible, that is compatible to previously developed standardized systems, there will arise a situation, in which, for example, a 2G SGSN as well as a 3G SGSN are both connected to the same cell and/or location (routing) area of an access network.

For example, so-called GERAN cells enable the connection of 2G as well as of 3G core network elements (for example, 2G SGSN and 3G SGSN) to the same cell/location (routing) area. (GERAN=GSM EDGE Radio Access Network, EDGE=Enhanced Data rates for GSM Evolution). In case of SGSN's as an example for core network elements, a 2G SGSN is connected to a GERAN cell/routing area (that is to the GERAN access network) via the Gb interface, whereas a 3G SGSN is connected thereto via the Iu-PS interface. Such a connection to a single GERAN cell/routing area of different core network elements of the same type (that is SGSN with Iu-PS or Gb interface), is, however, required in 3G communication networks.

However, because a single routing area (or cell (as a smallest conceivable routing area)) can be connected to two different SGSN's, one with Iu and other with Gb interface, the new SGSN receiving the terminal equipment's routing area update (RAU) request upon the detection of a necessity for routing area update does not know from which SGSN it should request the subscriber information associated with the requesting terminal, because the old routing area identifier RAI identifying the routing area in which the terminal equipment was previously present may indicate two different core network elements (i.e. 2G SGSN and 3G SGSN).

If, however, in the chosen example, a new SGSN does not know which previous SGSN to contact to retrieve the subscriber information of the requesting terminal equipment, a routing area update for a terminal equipment may fail and a call may be dropped.

Previously, in order to solve such a problem, it has been proposed to assign two separate routing area identities (RAI) to each routing area (and/or cell). However, assigning two identities inevitably doubles the address space for the routing areas, which is undesirable in terms of an additional need of network management in the core and access network. Also, the respective access network RAN (more specifically, the base stations and/or Node_B's) will have to broadcast two routing area identities for each routing area, while also terminals listening to the broadcasted information will have to be adapted to properly process and/or interpret the two broadcasted identities per routing area.

Thus, this previously proposed solution requires multiple changes to the existing communication network.

Document WO-A-00/21319 discloses the identification of a mobile station in a packet radio network. In this connection, the prior art document discloses that a temporary identity allocated to a mobile station by a core network element is allocated such that the network element encodes its own identifier, or part of it, into the temporary identity. The identity of the network element such as a SGSN node is assumed in this prior art to be derivable on the basis of the identities of the routing area served by the network element. However, as explained above, this assumption is no longer valid as a respective routing area is handled by several (different) network elements of the same network element type but of different core network types.

Therefore, the teaching as presented in WO-A-00/21319 can not be transferred to the present scenario in which it is required that a respective routing area has to be connectable to different core network elements of the same type.

SUMMARY OF THE INVENTION

Hence, the present invention provides an improved method of performing a routing area update for a terminal equipment in a communication network, which is suitable for a scenario in which it is required that a respective routing area has to be connectable to different core network elements of the same type, while still keeping the amount of resulting changes small.

The present invention provides a method of performing an area update for a terminal equipment in a communication network, the communication network comprising at least two areas being defined within an access network, at least one of said areas being served by at least two core network elements of corresponding network element types, each of said at least two core network elements communicating with said access network defining said areas via a different interface, the method comprising the steps of: monitoring, at the terminal equipment side, via which of said at least two core network elements serving a currently visited area the communication with the terminal equipment is effected, detecting, at the terminal equipment side, an area update condition for said terminal, requesting, by said terminal equipment, an area update for said terminal equipment, and wherein said terminal equipment sets an identifier in said area update request identifying the core network element via which the communication with the terminal equipment has previously been effected.

According to further developments of the present invention, said identifier set by said terminal equipment is part of the routing area identifier RAI;

said routing area identifier RAI is composed of a mobile country code MCC, a mobile network code MNC, a location area code LAC, and a routing area code RAC;

said identifier is at least one predetermined bit within said routing area identifier;

said identifier is the most significant bit of said routing area code RAC;

said identifier is the most significant bit of said location area code LAC;

a setting state of said most significant bit indicates a respective interface via which the previous routing and/or location area update has been performed such that said access network is connected to one of said different core networks;

for $2^N$ core network elements of a same network element type, the number of predetermined bits is predetermined to be N, said identifier set by said terminal equipment is part of the location area identifier (LAI).

Stated in other words, the core network element via which the communication with the terminal equipment has previously been effected is identified with the aid of the type of access network interface between the access network and the core network element.

Also, the present invention is for example achieved by a terminal equipment adapted to communicate via an access network with different core networks and adapted to carry out the method as defined herein above.

Accordingly, with the present invention it is advantageously enabled that the above mentioned problem is solved.

Also, no changes to the radio access network are required and the re-allocation of the routing area identifier, more precisely, the re-allocation of the routing area code within the routing area identifier, does not require any procedural changes to existing signaling. Re-allocation of the routing area identifier here means that only part (some bits) of the routing area identifier is used for routing area identification while another part of it is used for identification of the core network type to which the access network is connected for communication with the terminal equipment. Stated in other words, the RAI is partitioned to be used in parallel for routing area and core network identification.

Furthermore, as the identifier is carried as a part of the RAI this enables that no modifications are required to previously existing ("old") core network elements.

Rather, it is merely required to adapt the mapping involved with the routing area code RAC.

Still further, due to the terminal equipment performing the setting of the identifier, the core network is at least relieved from this network management function to be performed.

BRIEF DESCRIPTION OF THE DRAWINGS

The above and still other objects, features and advantages of the present invention will become more fully apparent upon consideration of the accompanying drawings, in which.

DETAILED DESCRIPTION OF THE EMBODIMENTS

Figure 1:
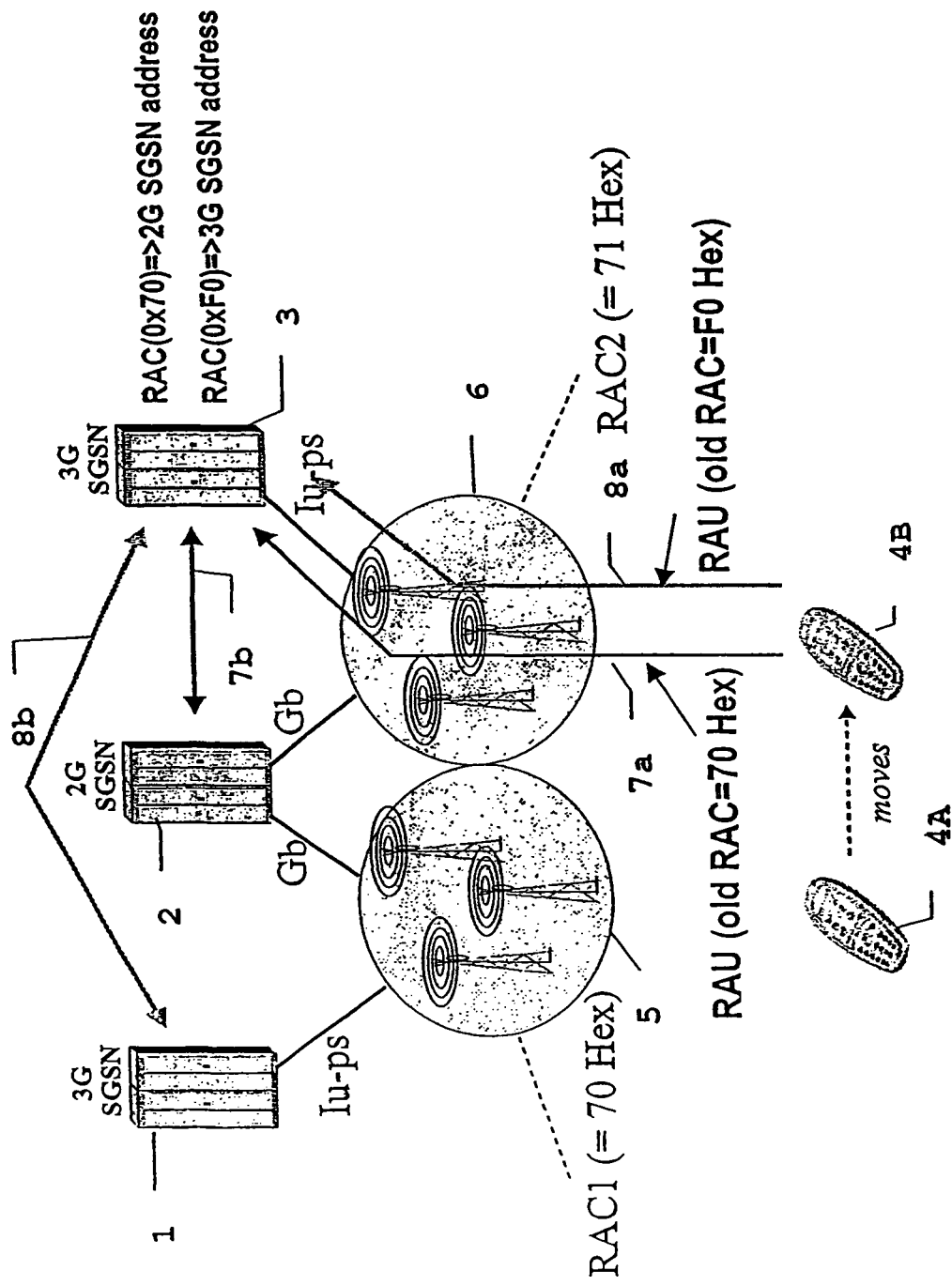
FIG. 1 illustrates a basic scenario of routing areas each connected to two core network elements of a same type but of respective different core networks, and a routing area update signaling involved in routing area update.

The present invention will now be explained in detail with reference to the drawings.

FIG. 1 illustrates a basic scenario of routing areas each connected to two core network elements of a same type but of respective different core networks, and a routing area update signaling involved in routing area update.

Nevertheless, it has to be noted that the cells of the new routing area do not necessarily have to be connected to two core network elements of a same type but of respective different core networks, rather it is sufficient for the present invention if at least one, that is only the previously visited, routing area to which registration has been performed is connected to two core network elements of a same type but of respective different core networks.

Firstly, the basic scenario will statically be described, that is without a focus to any signaling messages exchanged between the network elements.

FIG. 1 illustrates two routing areas 5 and 6, respectively. However, more than two routing areas are normally present within a communication network, but in order to keep the illustration simple for explanatory purposes, only two are shown. Each routing area 5, 6 is roughly represented as consisting of several individual cells. A cell is intended to be represented by a respective antenna representation as a symbol for a base station (not shown) with corresponding coverage area. Each routing area is identified by a routing area identifier RAI.

The routing area identifier RAI consists of four individual fields, i.e. MCC (mobile country code), MNC (mobile network code), LAC (location area code), and RAC (routing area code). The MCC identifies the country in which the network is operated, the MNC identifies the network (and via the network, the operator thereof). The LAC identifies the location are (i.e. cell or cell group). MCC, MNC, and LAC, however, of routing areas 5 and 6, respectively, are not shown in the FIG. 1. Rather, FIG. 1 indicates only the value of the routing area code RAC for these routing areas (RAC1 and RAC2). The RAC is an octet of eight bit length, and its value is indicated in hexadecimal notation. Namely, RAC1=70 "H"=0111 0000 "B" in binary representation. Likewise, routing area 6 is identified by routing area code RAC2=71 "H"=0111 0001 "B".

Each routing area 5, 6 represents an access network of a type, to which at least two types of core networks are connectable. For the present invention, a GERAN cell/routing area has been chosen as an example. However, the present invention is not limited to GERAN.

Thus, to the routing area 5 there is connected
1) a 2G core network for packetized data transmission represented by a core network element of a type of a 2G SGSN denoted by numeral 2, connected via an interface Gb, and
2) a 3G core network for packetized data transmission represented by a core network element 3G SGSN denoted by numeral 1, connected via an interface Iu-PS (Iu interface for packet switched traffic).

Likewise, to the routing area 6 there is connected
1) a 2G core network for packetized data transmission represented by a core network element of a type of a 2G SGSN denoted by numeral 2 (the identity of the 2G core network elements is for simplification of the explanation and drawing only, it is of course possible that different core network elements of the same functionality of the 2G core network are connected to different routing areas without any change in the present invention), connected via an interface Gb, and 2) a 3G core network for packetized data transmission represented by a core network element 3G SGSN denoted by numeral 3, connected via an interface Iu-PS (Iu interface for packet switched traffic).

As already mentioned before, it is also possible that the routing area 6 (to which the terminal equipment moves from the old/previous routing area) is connected only to a single core network element, while the present invention would still remain applicable to such a scenario.

A terminal equipment such as a mobile station MS or user equipment UE denoted by reference sign 4A, 4B representative of respective different situations for the terminal is communicating via/with the network and its network elements. Any terminal equipment may be used (radio or non-radio) as long as it is adapted for communication with different core networks. Also, any access network may be used, that is radio access network or non-radio access network, as long as it is adapted to the used terminal equipment.

The terminal equipment, in a first situation, is denoted by 4A and is attached to the "left hand" routing area identified by RAC1="70 Hex". The terminal equipment has a knowledge of the routing area identifier as the identifier is broadcasted by the access network such as GERAN. Namely, at the terminal equipment side, it is monitored via which of said at least two core network elements serving the currently visited routing area 5 the communication with the terminal equipment 4A is effected.

As the terminal in the illustrated example is a mobile terminal, it moves during communication as indicated by the dotted arrow. The moving of the terminal equipment results in the terminal equipment leaving the previous routing area 5 and entering a new routing area 6. Thus, upon entering the new routing area the terminal equipment detects this condition resulting in the necessity for a routing area update to be performed.

For explanatory purposes only, it is now assumed that the routing area update request issued by the terminal equipment is forwarded to the core network element denoted by numeral 3 of the 3G core network, that is to the 3G SGSN connected to the routing area 6.

Based on the result of monitoring, the terminal 4B in this situation knows the type of access network interface (Iu or Gb) between the radio network and the core network element via which the communication with the terminal equipment 4B (in situation 4A) has previously been effected. Thus, dependent on the result, the terminal equipment is adapted to forward two different RAU requests to the "new" core network element, that is 3G SGSN denoted with 3.

In a first case, it is assumed that in the routing area 5 which has previously been left by the terminal equipment, the connection has been established via the Gb interface to the 2G SGSN denoted by 2. In the routing area update request denoted by 7a, the terminal equipment includes the information on the old and/or previous routing area code (unchanged) so that an information of an RAI with an RAC=70 "Hex" is included in the request. Based on the information in the most significant bit MSB of the RAC=0111 0000 "B", i.e. "0", the core network element 3 receiving the routing area update request knows the type of the interface via which the ("previous") communication in the previous routing area was effected. The interface type is again representative of the core network type (e.g. $2^{nd}$ or $3^{rd}$ generation). Then, as the 3G SGSN denoted with 3 knows that in the previous routing area 5 the communication was effected via the interface Gb, it addresses the 2G SGSN core network element denoted by 2 in order to obtain the subscriber information associated to the terminal equipment 4A, 4B requesting the routing area update. This exchange of information between the 2G SGSN denoted by 2 and the 3G SGSN denoted by 3 is indicated by the arrow 7b.

If, on the other hand, it is assumed that in the routing area 5 which has previously been left by the terminal equipment, the connection has been established via the Iu-PS interface to the 3G SGSN denoted by 1, then in the routing area update request denoted by 8a, the terminal equipment includes the information on the old and/or previous routing area code with a modified most significant bit so that an information of an RAI with an RAC=F0 "Hex" is included in the request. Based on the information in the most significant bit MSB of the RAC=1111 0000 "B", i.e. "1", the core network element 3 receiving the routing area update request knows the type of the interface via which the previous communication in the previous routing area was effected. The interface type is again representative of the core network type (e.g. $2^{nd}$ or $3^{rd}$ generation). Then, as the 3G SGSN denoted with 3 knows that in the previous routing area 5 the communication was effected via the interface Iu-PS, it addresses the 3G SGSN core network element denoted by 1 in order to obtain the subscriber information associated to the terminal equipment 4A, 4B requesting the routing area update. This exchange of information between the 2G SGSN denoted by 2 and the 3G SGSN denoted by 3 is indicated by the arrow 8b.

A similar signaling (not shown) takes place in case of the routing area update request being forwarded to the core network element 2 (that is 2G SGSN). If in the previous routing area, communication was effected via the Gb interface, the 2G SGSN 2 learns that it does not have to contact any other core network element as in the illustrated example it itself has been in charge for communication with the terminal equipment. If on the other hand in the previous routing area, communication was effected via the Iu-PS interface, the 2G SGSN 2 learns that it has to contact the core network element 3G SGSN denoted by 1, so that a corresponding subscriber data exchange would be effected between 3G SGSN denoted by 1 and 2G SGSN denoted by 2.

Thus, each routing area has a single RAI containing a LAC and RAC. The terminal equipment indicates in the registration to a new core network element upon routing area update the mode (that is the type of interface, Iu versus Gb) in which a previous registration has been effected to a core network element in a previous routing area.

The invention re-allocates the RAC space by shortening the RAC space from eight to seven bits. Then, the most significant bit in the RAC indicates the type of the interface via which communication in the previous routing area was effected.

Also, in a case there is an access network which is simultaneously adapted for circuit switched data transmission, in FIG. 1 also an interface Iu-CS to a 3G MSC/VLR (not shown) and an A-interface to a 2G MSC/VLR (not shown) would be present. In such a case, the most significant bit of the LAC within the RAI is used for indicating the type of interface via which communication in the previous routing area was effected. This would result in shortening the LAC from 16 to 15 bits. A corresponding signaling in connection with routing area update will in this case be similar to the one as explained above.

According to a conceivable modification, also the LAC only could be used in case of a routing area updating. This alternative has the advantage that the RAC would not have to be shortened, since it is already only 8 bits long that is according to the modification, the most significant bit of LAC in RAI indicates the previous type of interface used. This alternative could be applicable if only routing areas can be connected to two core network nodes, but location areas are always connected to only one core network node.

Still further, herein above an explanation has been given for cases in which there is provided an access network to which two types of core networks are connectable. Nevertheless, the present invention remains still applicable in a case in which $2^N$ types of core networks (with a corresponding number of $2^N$ core network elements of a same network element type) are connectable to the access network (routing area). In such a case, the invention is easily to be adapted by selecting N as the number of predetermined bits, by which the LAC and/or RAC is to be shortened.

Thus, as has been explained above in connection with the present invention, the present invention solves a previously non-existing problem as only one core network element of a type (for example, SGSN) per routing area RA was possible. The invention resides in using, for example, the most significant bit of the routing area code RAC of the "old", i.e. previous routing area RA to indicate to the new network element such as a SGSN the type of the old SGSN. Otherwise, the old routing area code RAC is carried in the GPRS routing area update message to the new SGSN normally, that is unchanged. By inspecting the bit in the routing are identifier RAI and/or routing area code RAC and/or location area code LAC, the network element such as the SGSN knows which and which kind of network element (e.g. SGSN) to contact. In other words, in the network elements such as SGSN's, there will be two mappings for a masked routing area code RAC. One for most significant bit value 1 and one for value 0. The mappings correspond to the different core network systems.

It should be noted that although the preceding description referred to routing areas as an example, the present invention is applicable to other types of areas in communication networks such as location areas or simply cells as a minimal area. In addition, although the description focused on plural core network elements of same network element type being connected to an area (for example, SGSN's), the invention is not limited thereto. Rather, the invention is also applicable to cases in which only plural core network elements of corresponding network element types are connected to an area. This means that the core network elements merely have to be provided with roughly corresponding functions to be performed, that is, for example, the core network elements connected to an area need only to have a common subset of functions of the overall functions which they are adapted to perform. Still further, the above description focused on a case in which the core network elements were assumed to be belonging to different core networks (second generation 2G and third generation 3G). Nevertheless, this is not required for the present invention and the core network elements could actually be in the same common network (for example, an operator's IP subnet), as long as the access network interface types via which these are connected (such as Iu-PS and Gb) are different.

The correspondence of the network element types stated in above can be interpreted differently in different embodiments. In some embodiments of the invention the two core network element types serving the area are of rather similar type, for instance a 2G-SGSN and a 3G-SGSN. In other embodiments of the invention, the two types of core network elements may have different functionalities with respect to, for instance, user plane routing. It can be envisioned, for instance, that one type of the corresponding network element types is only performing mobility management related functions, whereas the rest of the functions are performed by other network elements. However, an another type of the corresponding network element types would also perform additionally many other functions such as participating in the routing of user plane traffic. However, they have at least one corresponding function provided, therefore they are only of corresponding types, not similar with respect to the set of functions provided. By corresponding type is meant that the two types of core network elements are both equipped with, as already mentioned, at least the means of communicating with the access network.

Accordingly, as has been described herein before, the present invention is a method of performing an area update for a terminal equipment 4A, 4B in a communication network 1, 2, 3, 5, 6, the communication network comprising at least two areas 5, 6 being defined within an access network, at least one of said areas being served by at least two core network elements 1-2, 2-3 of corresponding network element types, each of said at least two core network elements communicating with said access network defining said areas via a different interface Iu, Gb, the method comprising the steps of: monitoring, at the terminal equipment side, via which of said at least two core network elements 1, 2 serving a currently visited area 5 the communication with the terminal equipment 4A is effected, detecting, at the terminal equipment side, an area update condition for said terminal 4A, 4B, requesting, by said terminal equipment, an area update for said terminal equipment 4B, and wherein said terminal equipment 4B sets an identifier in said area update request identifying the core network element via which the communication with the terminal equipment 4A has previously been effected. Still further, the present invention proposes also an accordingly adapted terminal equipment.

The core network element via which the communication with the terminal equipment 4A has previously been effected is identified with the aid of the type of access network interface between the access network and the core network element.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. An apparatus, comprising a routing area change unit configured to detect a change of a first routing area to a second routing area and further configured to form a routing area update request to be sent into the second routing area, the routing area update request comprising at least a part of a routing area identifier of the first routing area, said routing area change unit further configured to selectively modify at least a part of the routing area identifier of the routing area update request so that the modified at least a part of the routing area identifier of the routing area update request identifies a type of core network element with which the apparatus was in communication in the first routing area.

2. The apparatus of claim 1, where the at least a part of the routing area identifier that can be selectively modified comprises a routing area code.

3. The apparatus of claim 1, where the at least a part of the routing area identifier that can be selectively modified comprises a location area code.

4. The apparatus of claim 1, where the at least a part of the routing area identifier that can be selectively modified consists of a most significant bit of a routing area code.

5. The apparatus of claim 1, where the at least a part of the routing area identifier that can be selectively modified consists of a most significant bit of a location area code.

6. The apparatus of claim 1, where the at least a part of the routing area identifier that can be selectively modified comprises at least one most significant bit of a routing area code.

7. The apparatus of claim 1, where the at least a part of the routing area identifier that can be selectively modified comprises at least one most significant bit of a location area code.

8. The apparatus of claim 1, where the core network element is comprised of a serving general packet radio system support node that is interfaced to the first routing area via a Gb interface.

9. The apparatus of claim 1, where the core network element is comprised of a serving general packet radio system support node that is interfaced to the first routing area via an Iu-PS interface.

10. The apparatus of claim 1, wherein the routing area identifier comprises a mobile country code, a mobile network code, a location area code, and a routing area code, and where the at least a part of the routing area identifier that is selectively modified comprises at least one bit of one of the routing area code or the location area code.

11. The apparatus of claim 1, where the first routing area is comprised of at least one cell served by at least one base station, and further comprising a communication unit configured to conduct bidirectional radio frequency communication with the at least one base station.

12. The apparatus of claim 1, where the first routing area is comprised of at least one cell served by at least one Node-B, and further comprising a communication unit configured to conduct bidirectional radio frequency communication with the at least one Node-B.

13. The apparatus of claim 1, embodied in a communication terminal.

14. The apparatus of claim 1, embodied in a user equipment.

15. A method, comprising:

conducting bidirectional wireless communication with an access network in a first routing area identified by a routing area identifier; and in response to detecting a change of the first routing area to a second routing area, sending a routing area update request into the second routing area, the routing area update request comprising at least a part of a routing area identifier of the first routing area, where sending comprises selectively modifying at least a part of the routing area identifier of the first routing area so that the modified at least a part of the routing area identifier of the routing area update request identifies a type of core network element in the first routing area.

16. The method of claim 15, where the at least a part of the routing area identifier that can be selectively modified comprises a routing area code.

17. The method of claim 15, where the at least a part of the routing area identifier that can be selectively modified comprises a location area code.

18. The method of claim 15, where the at least a part of the routing area identifier that can be selectively modified consists of a most significant bit of a routing area code.

19. The method of claim 15, where the at least a part of the routing area identifier that can be selectively modified consists of a most significant bit of a location area code.

20. The method of claim 15, where the at least a part of the routing area identifier that can be selectively modified comprises at least one most significant bit of a routing area code.

21. The method of claim 15, where the at least a part of the routing area identifier that can be selectively modified comprises at least one most significant bit of a location area code.

22. The method of claim 15, where the core network element is comprised of a serving general packet radio system support node that is interfaced to the first routing area via a Gb interface.

23. The method of claim 15, where the core network element is comprised of a serving general packet radio system support node that is interfaced to the first routing area via an Iu-PS interface.

24. The method of claim 15, wherein the routing area identifier comprises a mobile country code, a mobile network code, a location area code, and a routing area code, and where the at least a part of the routing area identifier that can be selectively modified comprises at least one bit of one of the routing area code or the location area code.

25. The method of claim 15, where the first routing area is comprised of at least one cell served by at least one base station, and where conducting bidirectional wireless communication conducts bidirectional radio frequency communication with the at least one base station.

26. The method of claim 15, where the first routing area is comprised of at least one cell served by at least one Node-B, and where conducting bidirectional wireless communication conducts bidirectional radio frequency communication with the at least one Node-B.

27. The method of claim 15, performed in a communication terminal.

28. The method of claim 15, performed in a user equipment.

29. An apparatus, comprising a routing area unit configured to receive, via an interface to an access network in a routing area, a routing area update request originated by a mobile communication apparatus, the routing area update request comprising at least a part of a routing area identifier that can be selectively modified by the mobile communication apparatus so that the modified at least a part of the routing area identifier of the routing area update request identifies a type of core network element with which the mobile communication apparatus was in communication in another routing area, said routing area unit further configured to exchange information with the identified type of core network element to obtain information associated with the mobile communication apparatus.

30. The apparatus of claim 29, where the at least a part of the routing area identifier that can be selectively modified comprises a routing area code.

31. The apparatus of claim 29, where the at least a part of the routing area identifier that can be selectively modified comprises a location area code.

32. The apparatus of claim 29, where the at least a part of the routing area identifier that can be selectively modified consists of a most significant bit of a routing area code.

33. The apparatus of claim 29, where the at least a part of the routing area identifier that can be selectively modified consists of a most significant bit of a location area code.

34. The apparatus of claim 29, where the at least a part of the routing area identifier that can be selectively modified comprises at least one most significant bit of a routing area code.

35. The apparatus of claim 29, where the at least a part of the routing area identifier that can be selectively modified comprises at least one most significant bit of a location area code.

36. The apparatus of claim 29, comprised of a serving general packet radio system support node that is interfaced to the access network via a Gb interface.

37. The apparatus of claim 29, comprised of a serving general packet radio system support node that is interfaced to the access network via an Iu-PS interface.

38. The apparatus of claim 29, wherein the routing area identifier comprises a mobile country code, a mobile network code, a location area code, and a routing area code, and where the at least a part of the routing area identifier that can be selectively modified comprises at least one bit of one of the routing area code or the location area code.

39. The apparatus of claim 29, where the access area is comprised of at least one cell served by at least one base station.

40. The apparatus of claim 29, where the access area is comprised of at least one cell served by at least one Node-B.

41. A method, comprising:
receiving, via an interface to an access network in a routing area, a routing area update request originated by a mobile communication apparatus, the routing area update request comprising at least a part of a routing area identifier that can be selectively modified by the mobile communication apparatus so that the modified at least a part of the routing area identifier of the routing area update request identifies a type of core network element with which the mobile communication apparatus was in communication in another routing area; and
exchanging information with the identified type of core network element to obtain information associated with the mobile communication apparatus.

42. The method of claim 41, where the at least apart of the routing area identifier that can be selectively modified comprises a routing area code.

43. The method of claim 41, where the at least a part of the routing area identifier that can be selectively modified comprises a location area code.

44. The method of claim 41, where the at least a part of the routing area identifier that can be selectively modified consists of a most significant bit of a routing area code.

45. The method of claim 41, where the at least a part of the routing area identifier that can be selectively modified consists of a most significant bit of a location area code.

46. The method of claim 41, where the at least a part of the routing area identifier that can be selectively modified comprises at least one most significant bit of a routing area code.

47. The method of claim 41, where the at least a part of the routing area identifier that can be selectively modified comprises at least one most significant bit of a location area code.

48. The method of claim 41, performed in a serving general packet radio system support node that is interfaced to the access network via a Gb interface.

49. The method of claim 41, performed in a serving general packet radio system support node that is interfaced to the access network via an Iu-PS interface.

50. The method of claim 41, wherein the routing area identifier comprises a mobile country code, a mobile network code, a location area code, and a routing area code, and where the at least a part of the routing area identifier that can be selectively modified comprises at least one bit of one of the routing area code or the location area code.

51. The method of claim 41, where the access area is comprised of at least one cell served by at least one base station.

52. The method of claim 41, where the access area is comprised of at least one cell served by at least one Node-B.

53. An apparatus, comprising means for detecting a change of a first routing area to a second routing area and means for composing a routing area update request to be sent by a wireless communication into the second routing area, the routing area update request comprising at least a part of a routing area identifier of the first routing area that is selectively modifiable so that the modified at least a part of the routing area identifier of the routing area update request identifies a type of core network element with which the apparatus was in communication in the first routing area.

54. The apparatus of claim 53, where the at least a part of the routing area identifier that is selectively modifiable comprises a routing area code or a location area code.

55. An apparatus, comprising:
means for receiving, via an interface to an access network in a routing area, a routing area update request originated by a mobile communication apparatus, the routing area update request comprising at least a part of a routing area identifier that can be selectively modified by the mobile communication apparatus so that the modified at least a part of the routing area identifier of the routing area update request identifies a type of core network element with which the mobile communication apparatus was in communication in another routing area; and
means for exchanging information with the identified type of core network element to obtain information associated with the mobile communication apparatus.

56. The apparatus of claim 55, where the at least a part of the routing area identifier that can be selectively modified comprises a routing area code or a location area code.

57. An apparatus, comprising routing area circuitry configured to detect a change of a first routing area to a second routing area and further configured to compose a routing area update request to be sent by a wireless communication into the second routing area, the routing area update request comprising at least a part of a routing area identifier of the first routing area that is selectively modifiable so that the modified at least a part of the routing area identifier of the routing area update request identifies a type of core network element that serves the first routing area.

58. The apparatus of claim 57, where the at least a part of the routing area identifier that is selectively modifiable comprises a routing area code or a location area code.

59. The apparatus of claim 57, where the at least a part of the routing area identifier that is selectively modifiable comprises at least one most significant bit of a routing area code or a location area code.

60. The apparatus of claim 57, where the core network element is comprised of a serving general packet radio system support node that is interfaced to the first routing area via a Gb interface or via an Iu-PS interface.

* * * * *